United States Patent [19]
Schmidt et al.

[11] 3,852,246
[45] Dec. 3, 1974

[54] POLYESTERIMIDE RESINS
[75] Inventors: Karl Schmidt; Gerhard Neubert, both of Hamburg, Germany
[73] Assignee: Dr. Beck & Co. GmbH, Hamburg, Germany
[22] Filed: Feb. 29, 1972
[21] Appl. No.: 230,535

Related U.S. Application Data
[63] Continuation of Ser. No. 18,373, March 12, 1970, abandoned, which is a continuation of Ser. No. 706,187, Feb. 16, 1968, abandoned, which is a continuation of Ser. No. 458,746, May 25, 1965, abandoned.

[52] U.S. Cl............ 260/75 N, 117/232, 260/33.4 P, 260/76, 260/77
[51] Int. Cl.............................................. C08g 20/32
[58] Field of Search.................... 260/75 N, 76, 77

[56] References Cited
UNITED STATES PATENTS
3,382,203    5/1968   Rating................... 260/33.4

*Primary Examiner*—Melvin Goldstein
*Attorney, Agent, or Firm*—Burgess, Dinklage & Sprung

[57] ABSTRACT

Heat hardenable polyesterimide resins are produced from a polybasic carboxylic acid, a polyhydric alcohol, a polyvalent premary amine and at least a molar excess of a volatile glycol.

8 Claims, No Drawings

POLYESTERIMIDE RESINS

This is a continuation of application Ser. No. 18,373, filed Mar. 12, 1970, which is a continuation of Ser. NO. 706,187, filed Feb. 16, 1968, which is a continuation of Ser. No. 458,746, filed May 25, 1965 all now abandoned.

This invention relates to a process for manufacturing heat-hardenable polyesterimide resins containing imide groups and possibly also amide groups.

The invention further relates to the use of these new resins for the purpose of electrical insulation, and therefore to electrical conductors which are isulated with these resins.

In the U.S. patent application Nos. 238,315, 371,093, 384,262 and 411,085 the manufacture of a new class of synthetic resins is described, which are distinguished by the fact that, on the one hand, they contain polyester groups and, on the other hand, cyclic imide groups. The resins, because of their structure, are also known as polyesterimide resins. They may be obtained, for example, by condensing polybasic carboxylic acids with polyhydric alcohols, optionally with the concurrent use of hydroxycarboxylic acids and/or aminocarboxylic acids and/or amino alcohols and/or polyvalent amines which contain secondary amino groups, at least one of the starting materials containing one or more five-membered imide rings in such a configuration that the functional groups of the compound concerned are linked with one another through different members of the particular imide ring. However, the formation of the imide ring may also take place simultaneously with the formation of the polyester groups, so that the most varied possibilities are available for the production of these polyesterimides and are described in the aforementioned prior patent applications.

Products made from these resins, for example, films, foils or fibres, possess an excellent thermal stability, good resistance to solvent attack, a high film hardness and great flexibility. Particularly striking is the extremely good resistance to thermal shock. These synthetic resins are, therefore, especially advantageous for use in the insulation of electrical conductors.

Polyester resins containing imide groups have, particularly as the imide group content becomes higher and even more especially as the content of aromatically substituted imide groups becomes higher, a relatively high melting point or softening point and they are soluble exclusively in very highly polar solvents, in particular phenols. Solvents which have a less aggressive effect upon other insulating materials, e.g. solvents such as benzene hydrocarbons, esters, ethers, alcohols and ketones, can only be used as diluents.

Polyester resins which are rich in imide groups are conveniently produced by condensation in the presence of phenols, which latter then simultaneously act as the solvent for the ultimate condensation product. The solvent-free polyesterimide resins can then be obtained from the phenolic solution by precipitation and by extraction using non-solvents. The complete removal of phenolic solvent residues, as is necessary or desirable in many applications, is however usually difficult, time-wasting and uneconomical.

It is required in many applications to produce polyesterimide resins which, despite a high imide group content, have a relatively low melting point or softening point, for example, to render them suitable for subsequent processing to form mouldings, laminates, spin sintering powders or flame-spraying powders. In other cases, such as, for example, in the manufacture of impregnating varnishes, it is also desirable to dissolve the synthetic resins in solvents which have the least possible degree of aggressiveness and which have little smell or produce an odour which as far as possible is not offensive.

It has now surprisingly been discovered that heat-hardenable polyesterimide resins which may contain amide groups, can be produced which have relatively low melting points and relatively good solubilities.

According to the present invention, there is provided a process for the preparation of a heat-hardenable polyesterimide resin which comprises the steps of reacting at least one polybasic carboxylic acid or reactive derivative thereof with at least one polyhydric alcohol and at least one polyvalent primary amine or reactive derivative thereof to form a polycondensation product containing, in addition to ester groups, at least one five-membered imide ring in the polymer chain, wherein the reaction of the starting materials to form said polycondensation product is carried out in the presence of a surplus of at least one lower molecular weight, volatile glycol, at least a part of the surplus of said glycol being separated off after the polycondensation has been effected.

The reaction mixture may also include, if desired, one or more hydroxycarboxylic acids and/or aminocarboxylic acids and/or aminoalcohols and/or polyvalent amines containing secondary amino groups.

The condensation of the starting materials may be effected in accordance with the procedures described in the aforementioned prior patent applications.

The amount of the surplus glycol used may be at least 1 mols, and preferably at least 2 mols for each ester group in the polyesterimide resin.

Lower molecular weight, volatile glycols which may be used in the present invention include, for example, ethylene glycol, 1,2- and 1,3-propandiol, butylene glycol and diethylene glycol. Preferentially, however, ethylene glycol is employed, since this enables particularly favourable hardening properties and film properties to be obtained. Conveniently, the starting materials may be reacted with one another in an at least 20 percent by weight solution or suspension in the glycol. In an especially preferred embodiment of the invention, the starting materials containing the imide groups are condensed in a 30–70 percent by weight solution or suspension in the glycol, optionally in the presence of further polyester components. With this procedure, starting materials containing imide groups obtained from aromatic amines and which on formation produce an extraordinarily voluminous precipitate, can be produced and esterified without difficulty.

The separating off of the surplus glycol used is best carried out only after the complete esterification of all the starting materials and may be effect by distillation, if desired, under vacuum. The advantage of this procedure is that by appropriate selection of the distillation temperature and time, the softening point or flow point of the polyesterimide resin can be arbitrarily varied within very wide limits and made to suit the particular application for which it is required. The more glycol that is separated off in this way, the higher becomes the softening point or flow point of the resin.

By using a rectification device, the condensation can be effected with hardly any loss of ethylene glycol, only water formed during the reaction being distilled off. The surplus glycol distilled off after condensation can be used over again for the production of the polyesterimide resins.

The esterification reaction can be promoted by using the usual esterification catalysts. Particularly effective for this purpose are titanium, tin and antimony compounds.

The products obtained by the process according to the invention can be further processed directly in solvent-free form and used, for example, in the molten state or in the solid state to manufacture mouldings, laminates, films, or foils, or they may be used in powdered form for spin sintering and flame-spraying. Again, however, it is possible to dissolve the products produced in accordance with the invention in suitable solvents and apply them in the form of varnishes.

These resins, when dissolved in commercial cresol or xylol mixtures with the addition of benzene hydrocarbons, are suitable, for example, for varnishing electrical conductors. Wire varnishes can be produced which, compared with known wire varnishes based on polyesterimide resins have a higher solids content for the same viscosity.

As compared with polyesterimide resins produced in accordance with previously known processes, the products prepared in accordance with the invention also exhibit improved solubility in polar solvents and better dilution properties in association with non-solvents such as benzene hydrocarbons, alcohols, glycol ethers and ketones. Frequently, they are soluble in non-phenolic polar solvents, for example, in cyclic ketones such as cyclohexanone, in ketoalcohols such as diacetone alcohol, in ether alcohols such as furfuryl alcohol, ethylglycol and ethyldiglycol, in N,N-dialkylamides such as dimethylformamide and dimethylacetamide, and in chlorohydrocarbons such as methylene chloride. It is, therefore, possible to use the products produced in accordance with the invention for the manufacture of impregnating varnishes and for varnishes for impregnating woven fibres, films of which varnishes are distinguished by their extremely good long-term heat resistance and good behaviour under thermal overloading. These varnishes can be hardened at temperatures above 180°C.

Also, the resins produced in accordance with the invention may be combined with other synthetic resins or pigmented for the manufacture of mouldings and powders for spin sintering and flame-spraying. Advantageously, pigmenting may be effected by first of all preparing a pigment paste from the pigment and part of the surplus glycol in known manner, for instance by grinding, and subsequently introducing this paste into the condensation ingredients prior to the separating off of the surplus glycol.

The polyesterimide resins produced in accordance with the invention are particularly suited for electrical insulation purposes. They are extremely versatile in application in this field, being suitable for use, for example, as insulating layers on electrical conductors such as wires and for use as premanufactured intermediate layers between metal components carrying current, and so forth. The processing of the resins can for such purposes be effected using known methods such as are described, for example, in the aforementioned prior patent applications.

The invention is illustrated by the following examples:

EXAMPLE 1

166 parts by weight of terephthalic acid and 34 parts by weight of pentaerylthritol, 2.45 parts by weight of tin oxalate and 2.45 parts by weight of antimony trioxide being added at the same time, are esterified for 1½ hours at between 180°C and 190°C in 900 parts by weight of ethylene glycol. Subsequently, the clear solution has added to it at 170°C, a mixture of 198 parts by weight of 4,4'-diaminodiphenylmethane and 386 parts by weight of trimellitic acid anhydride in 10 increments over a period of 30 minutes; before each successive increment is added, the splitting off of water by imide group formation as a consequence of the addition of the preceding increment is allowed to take place. The result is a thick slurry which can nevertheless be easily stirred and which contains the developed diimide dicarboxylic acid in the form of a yellow deposit. After a further 2 hours condensation at between 190°C and 200°C, a clear solution results. Subsequently, the surplus ethylene glycol is finally distilled off under vacuum, the temperature being raised to 230°C, until the resin has a flow point in the melting tube of 105°C.

The melt can be employed directly for coating and impregnating shaped components. A film produced upon a metal sheet by dipping it in the melt and hardened for 2 hours at 220°C, has a smooth bubble-free surface, high surface hardness, very good flexibility, and extreme resistance to solvent attack, to moisture, to the effects of temperature change and to thermal overload; it stands up excellently to continuous heating conditions.

The melt when cooled to room temperature is brittle and can easily be powdered. The powdered polyesterimide resin is suitable for the coating, in a spin sintering process, of objects which have been heated to above the sintering point of the resin, for flame-spraying, for the production of mouldings and for other purposes.

To pigment the polyesterimide resin, a combination of kneading and milling in a three-roll mill is used to produce a pigment paste from 40 parts by weight of pigment (titanium dioxide, red iron oxide), 40 parts by weight of filler (talcum, mica), 20 parts by weight of an inorganic consolidating medium (aerosil or bentone) and 240 parts by weight of ethylene glycol, and this paste is introduced into the above mixture before the ethylene glycol is distilled off.

EXAMPLE 2

A polyesterimide resin is prepared in the same way as in Example 1. On termination of condensation, the surplus ethylene glycol is, however, distilled off by raising the temperature to 280°C, until the flow point of a sample in the melting tube is 160°C.

The resin obtained can be processed and hardened as in Example 1. For the same processing conditions, films of greater thickness are obtained.

To produce a wire varnish, 360 parts by weight of this polyesterimide resin are dissolved warm in 640 parts by weight of a mixture consisting of 50 parts by weight of commercial cresol, 25 parts by weight of xylol and 25 parts by weight of solvent naphtha.

A varnish obtained in this way, has a viscosity in accordance with German Standard Specification DIN 53 211, measured in a 4 mm cup at 20°C, of 110 secs. and had the following characteristics after being applied in 6 continuous stages from a roller and felt applicator to a 1 mm diameter copper wire in a horizontal stoving oven 3.5 m long operated at a temperature of 480°C, the wire being drawn through at a rate of 4.5 m per minute and having a finished coating thickness (increase in diameter) of 0.05 mm:

| pencil hardness grade | | 4 H |
|---|---|---|
| do. | after being held for 30 mins. in benzene at 60°C | 3 H |
| do. | after being held for 30 mins. in methylated spirit at 60°C | 3 H |
| do. | after being held for 30 mins. in water at 60°C | 3 H. |

After the wire had been strained up to the point of rupture of the copper (33 percent), the varnish film was still adhering to the wire in an acceptable manner and was undamaged.

A coil formed under a 0.5 kp/cm² load from a wire previously strained by 25 percent about a diameter 4 times the wire diameter, had an unimpaired varnish film.

For a wire length of 27 cm, after the wire had been twisted through 97 full turns the varnish film ruptured.

Heat shock test: A coil about a diameter twice the wire diameter, was still in order after 1 hour's annealing at 200°C.

After 16 hours annealing of the wire at 200°C, the ductility of the varnish film was 27 percent.

Overload test: The insulated wire, of nominal diameter 1 mm, was wound to a thickness of 4 layers to form a coil on a test body made of porcelain in accordance with German Standard Specification DIN 46 453. An iron core was inserted into the test body. Across this coil, a voltage was applied to such magnitude that the initial current was 14.5 amps. Due to the heating effect, the resistance increased and the current dropped to about 9 amps. As soon as short-circuiting between windings took place due to partial failure of the insulation, and the current has risen to 11 amps, the test was considered completed. The time required for this to take place, is used as a measure of the degree of overload which the wire insulation will stand. The time in this case was greater than 50 minutes.

EXAMPLE 3

A mixture of 520 g of aniline, 250 g of water and 700 g of 30 percent hydrochloric acid is heated to 60°C and, stirring being carried out the while, 345 g of 30 percent aqueous formaldehyde solution introduced dropwise over a period of 3 hours. Subsequently, heating is carried out for a further hour up to 95°C. Cooling then follows to 60°C and 1,160 g of 22.5 percent caustic soda solution are added. A brown oil is precipitated which separates from the aqueous phase and is washed 5 times in successive batches of 500 g of warm water. The remainder of the water and surplus aniline are distilled off from the oil under a vacuum of about 20 mm of mercury at temperatures up to 190°C. The resultant product is a viscous brown resin the equivalent weight of which is determined by potentiometric titration with perchloric acid in acetic acid, and is found to be 105.

200 parts by weight of this resin are dissolved in 400 parts by weight of ethylene glycol at 100°C, nitrogen being introduced. The solution has added to it at 130°C, 384 parts by weight of trimellitic acid anhydride. The reaction mixture is raised to 200°C over a period of 1 hour. At 150°C, a predominantly yellow deposit is formed. Condensation is continued for 2 hours at 220°C. Subsequently, the surplus ethylene glycol is distilled off under vacuum, the temperature being raised to 220°C, until the residual resin has a flow point in the melting tube of 150°C.

The polyesterimide resin obtained in this fashion can be processed in the same way as described in Examples 1 and 2, and may be hardened at temperatures about 190°C. Besides phenols, the resin can also be dissolved in, for example, cyclohexanone, dimethylformamide, dimethylacetamide and furfuryl alcohol. A 50 percent solution of the resin in a solvent mixture consisting of 50 parts by weight of cyclohexanone and 50 parts by weight of ethyl glycol is suitable as an impregnating varnish and after hardening for 4 hours at 200°C or for 2 hours at 230°C, gives varnish films which have high superficial hardness, good flexibility, excellent resistance to solvent attack, to moisture, to changes in temperature and to thermal overload, and excellent resistance to continuous heating conditions.

EXAMPLE 4

288 parts by weight of trimellitic acid anhydride are esterified with 372 parts by weight of ethyleneglycol for 2 hours at between 170° and 190°C and for 2 hours at between 190° and 200°C. The solution of trimellitic acid glycol ester in ethylene glycol, has added to it at 150°C 218 parts by weight of 4,4'-diaminodiphenylmethane and 96 parts by weight of trimellitic acid anhydride, nitrogen being introduced at the same time. Condensation is continued for 1 hour at 190°C and, subsequently, the surplus ethylene glycol is distilled off under vacuum at 190°C until the residual resin has a flow point in the melting tube of 95°C.

The resin thus obtained may be further processed in molten form, as a divided solid, or in solution, and may be hardened at temperatures about 180°C. It is soluble not only in phenols but also, for example, in cyclohexanone, dimethylformamide, dimethylacetamide, furfuryl alcohol, diacetone alcohol, ethylglycol and ethyldiglycol. The 50 to 60 percent solution of the resin in ethylglycol can then, for example, be employed to impregnate electrical windings. The varnish film, hardened for 2 hours at 200°C, is distinguished by its extremely high surface hardness, good flexibility and excellent resistance to the effects of thermal loading.

EXAMPLE 5

250 parts by weight of pyromellitic acid and 1240 parts by weight of ethylene glycol are condensed for 2 hours at between 170° and 190°C and for 2 hours at between 190° and 200°C, one part by weight of tin oxalate and one part by weight of antimony trioxide being introduced at the same time. The solution of the pyromellitic acid glycol ester had added to it at 130°C, 435 parts by weight of 4,4'-diaminodiphenylmethane and 460 parts by weight of trimellitic acid anhydride, nitrogen being introduced into the reaction vessel. The reaction mixture is heated to 190°C over a period of 30 minutes, resulting in a copious yellow deposit. The condensation is continued for 1 hour at 200°C and subsequently the surplus ethylene glycol distilled off under vacuum at 200°C until the clear condensation product has a flow point of 100°C.

The resin thus obtained is brittle and can therefore easily be divided. It is soluble not only in phenols but also in, for example, dimethylformamide, cyclohexanone and furfuryl alcohol and at temperatures above 180°C can be hardened to form a hard, flexible film which is highly resistant to thermal loading.

We claim:

1. In a process for the preparation of a heat-hardenable polyesterimide resin which comprises the steps of reacting at least one polybasic carboxylic acid or reactive derivative thereof with at least one polyhydric alcohol and at least one polyvalent primary amine or reactive derivative thereof to form a polycondensation product containing, in addition to ester groups, at least one five-membered imide ring in the polymer chain, the improvement which comprises carrying out the reaction of the starting materials to form said polycondensation product in the presence of a surplus of at least one lower molecular weight, volatile glycol, said surplus being at least 2 mol glycol per ester group present in said polycondensation product, at least a part of the surplus of said glycol being separated off after the polycondensation has been effected.

2. A process according to claim 1, wherein the reaction mixture also includes one or more hydroxycarboxylic acids and/or aminocarboxylic acids and/or aminoalcohols and/or polyvalent amines containing secondary amino groups.

3. A process according to claim 1, wherein the starting materials for the formation of said polycondensation product are reacted in an at least 20 percent by weight solution or suspension in said glycol.

4. A process according to claim 3, wherein the starting materials for the formation of said polycondensation product are reacted in 30 to 70 percent by weight solution or suspension in said glycol.

5. A process according to claim 1, wherein said glycol is ethylene glycol, 1,2-propanediol, 1,3-propanediol, or butylene glycol.

6. A heat-hardenable polyesterimide resin prepared by the process of claim 1.

7. A process according to claim 3, wherein said glycol is ethylene glycol, 1,2-propanediol, 1,3-propanediol, or butylene glycol.

8. A resin produced by heat-hardening the resin of claim 6.

* * * * *

UNITED STATES PATENT OFFICE
CERTIFICATE OF CORRECTION

Patent No. 3,852,246    Dated December 3, 1974

Inventor(s) Karl Schmidt et al

It is certified that error appears in the above-identified patent and that said Letters Patent are hereby corrected as shown below:

First page, add:

--[30] Foreign Application Priority Data

June 9, 1964   Germany   B 77 166--

Signed and sealed this 11th day of February 1975.

(SEAL)
Attest:

RUTH C. MASON
Attesting Officer

C. MARSHALL DANN
Commissioner of Patents
and Trademarks